United States Patent Office.

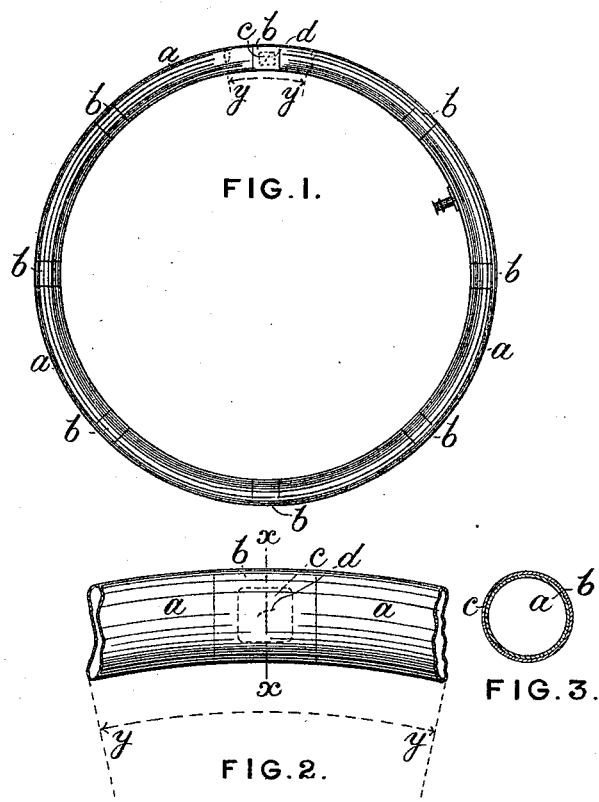

JOHN PEARSON, OF LEVENSHULME, ENGLAND, ASSIGNOR OF TWO-THIRDS TO JOHN BENNETT PRICE, OF CHORLTON-CUM-HARDY, AND EDWARD TURNER WHITELOW, OF MANCHESTER, ENGLAND.

PNEUMATIC TIRE.

SPECIFICATION forming part of Letters Patent No. 582,830, dated May 18, 1897.

Application filed May 28, 1896. Serial No. 593,495. (No model.)

*To all whom it may concern:*

Be it known that I, JOHN PEARSON, a subject of the Queen of Great Britain and Ireland, and a resident of 16 Broome Avenue, Levenshulme, county of Lancaster, England, have invented certain Improvements in or Applicable to Pneumatic Tires, of which the following is a specification.

The object of this invention is to provide means for the ready repair of punctures in the inflating-tubes of pneumatic tires.

In the drawings, Figure 1 is a side view of an inflating-tube with this invention applied thereto. Fig. 2 is an enlarged view of the portion $y\ y$ of Fig. 1. Fig. 3 is a cross-section through $x\ x$ of Fig. 2.

Onto the inflating-tube $a$ and in immediate contact therewith I thread one or more short tubes, rings, or sleeves $b$, of india-rubber or other elastic material or fabric. They are not permanently attached to the air-tube, but each one may be slid to any desired point in the circumference of the air-tube. Each of these rings or sleeves constitutes an elastic expanding ligature gripping the air-tube from the first moment of inflation and expanding with the air-tube.

In the event of puncture $d$ or other local damage to the air-tube $a$ the defective part is covered with a patch $c$ of repairing material—as, for example, a piece of paper, cloth, rubber, or other fabric covered with adhesive material. Over this patch one of the rings or sleeves $b$ is drawn, when it will act as a bandage, and compressing and holding the patch to the air-tube will prevent its displacement or the escape of air at the commencement of the reinflation, until it is further supported by the resistance of the outer cover. A repair can thus be rapidly and effectively completed.

The sleeves or rings are preferably threaded onto the inflating-tube before it is joined up into an endless ring.

What I claim as my invention, and desire to secure by Letters Patent, is—

In combination with the air-tube of a pneumatic expansible tire, a ring or sleeve encircling the same and constituting an elastic expanding ligature, adapted to grip the said tube from the first moment of inflation, and to expand with the said tube but movable over any puncture which may occur, thereby mending the tube at that point substantially as set forth.

In testimony whereof I have signed my name to this specification in the presence of two subscribing witnesses.

JOHN PEARSON.

Witnesses:
 JOHN HALL,
 JOSEPH BENTON.